United States Patent [19]

Peters et al.

[11] 4,223,201
[45] Sep. 16, 1980

[54] LASER WELDING APPARATUS FOR SHIPYARD PANEL SHOPS

[75] Inventors: George T. Peters, Farmington, Conn.; Kjell Lonning, Stord, Norway

[73] Assignee: United Technologies Corporation, Hartford, Conn.

[21] Appl. No.: 969,597

[22] Filed: Dec. 14, 1978

[51] Int. Cl.³ .......................................... B23K 27/00
[52] U.S. Cl. ..................... 219/121 LC; 219/121 LS; 219/121 LU; 219/161
[58] Field of Search ..... 219/121 L, 121 LM, 121 EB, 219/121 EM, 102–104, 107, 158, 161, 162, 124.1, 125.1, 125.11, 137; 228/29, 44.1 R

[56] References Cited

U.S. PATENT DOCUMENTS

| 2,638,524 | 5/1953  | Meyer              | 219/126    |
| 2,737,565 | 3/1956  | Meyer              | 219/126    |
| 2,781,441 | 2/1957  | Ballentine, Jr. et al. | 219/126 |
| 3,779,444 | 12/1973 | Kensrue            | 228/44.1 X |
| 3,855,445 | 12/1974 | Jungle             | 219/121 EB |
| 4,056,705 | 11/1977 | Linam et al.       | 219/125.1  |

Primary Examiner—C. L. Albritton
Attorney, Agent, or Firm—Lawrence A. Cavanaugh

[57] ABSTRACT

An automated welding facility for the fabrication of shell sections suitable for ship construction utilizing laser welding is disclosed. The facility includes a panel welding station which includes an optical system for providing radiation for automated two-sided welding of plates to form panels utilizing sequential welding of the top and bottom halves of the plates. The panel welding station is adapted for aligning the plates to form a seam therebetween and for providing tack welds along the length of abutting plates while simultaneously providing position coordinates of the seam to a controller adapted for controlling the positioning of laser welding heads for automating finish welding of the plates to form panels. The panel welding station further includes automated means for marking the panels for positioning stiffeners, webs and/or bulkheads thereon. An embodiment includes a stiffener welding station, located downline the panel welding station, for positioning and aligning stiffeners on the panel utilizing the markings made at the panel welding station and for simultaneous two-sided fillet welding of the stiffeners to the panels utilizing laser radiation, and means for moving the panels between stations. A further embodiment includes an automated web/bulkhead laser welding station for welding webs and/or bulkheads to the stiffeners and panel to form shell sections suitable for ship construction.

11 Claims, 9 Drawing Figures

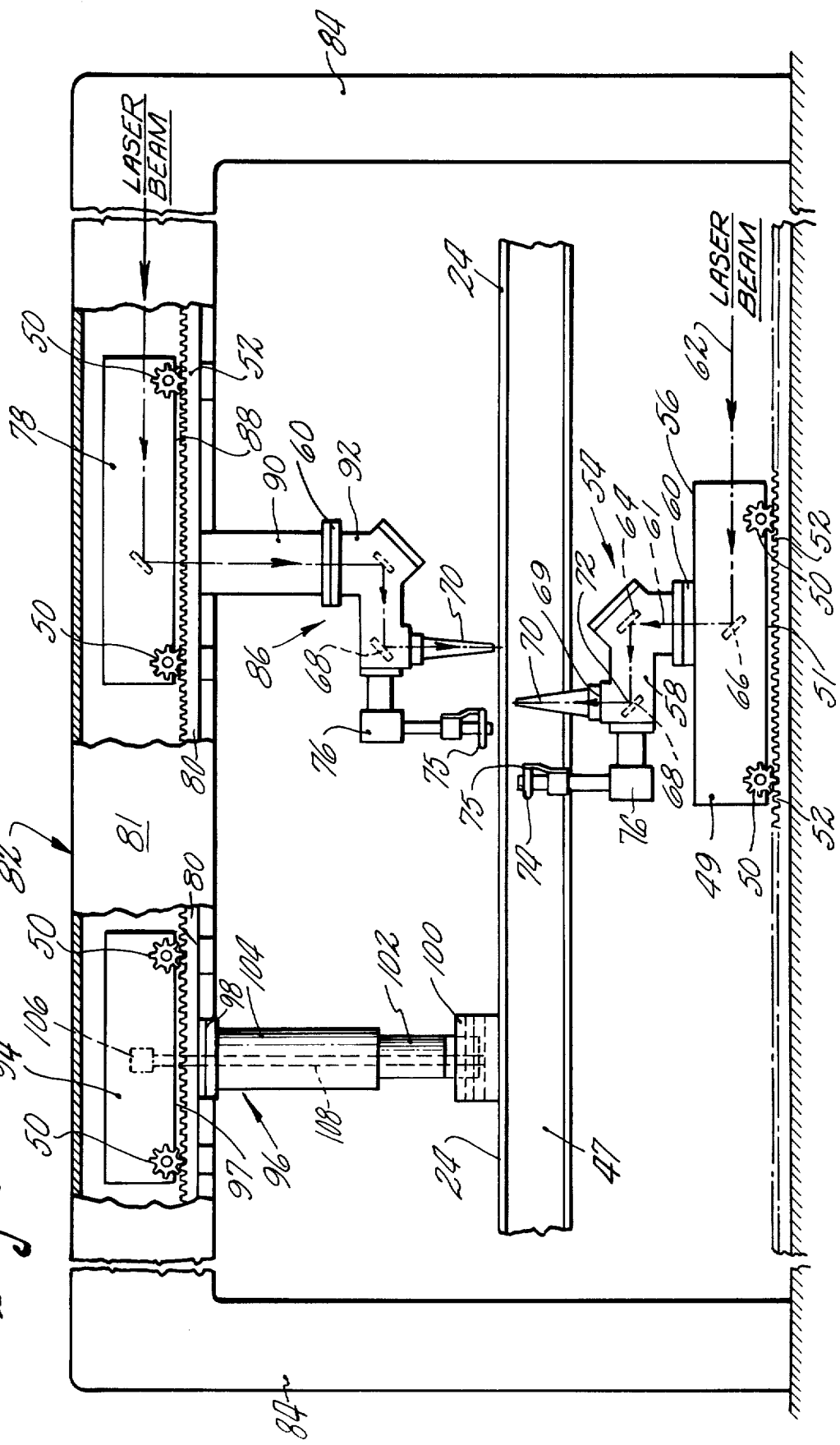

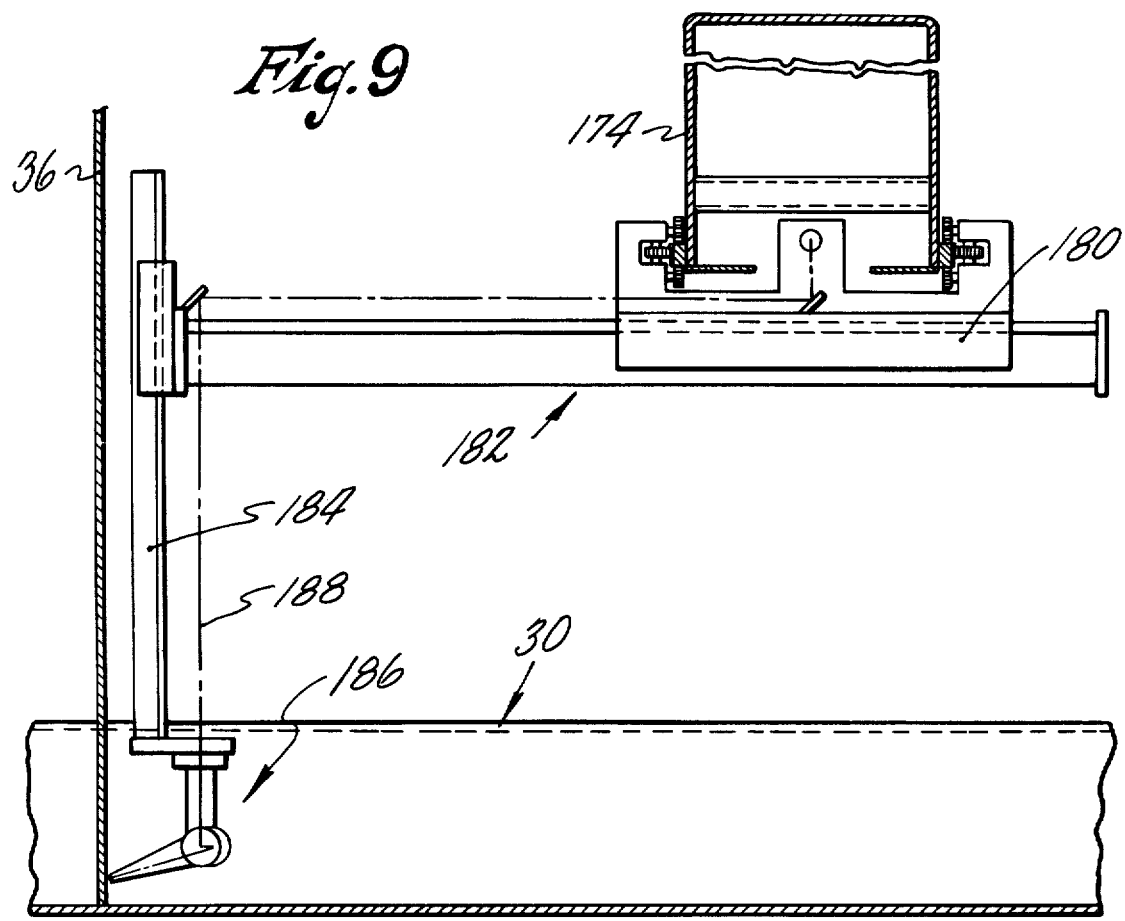
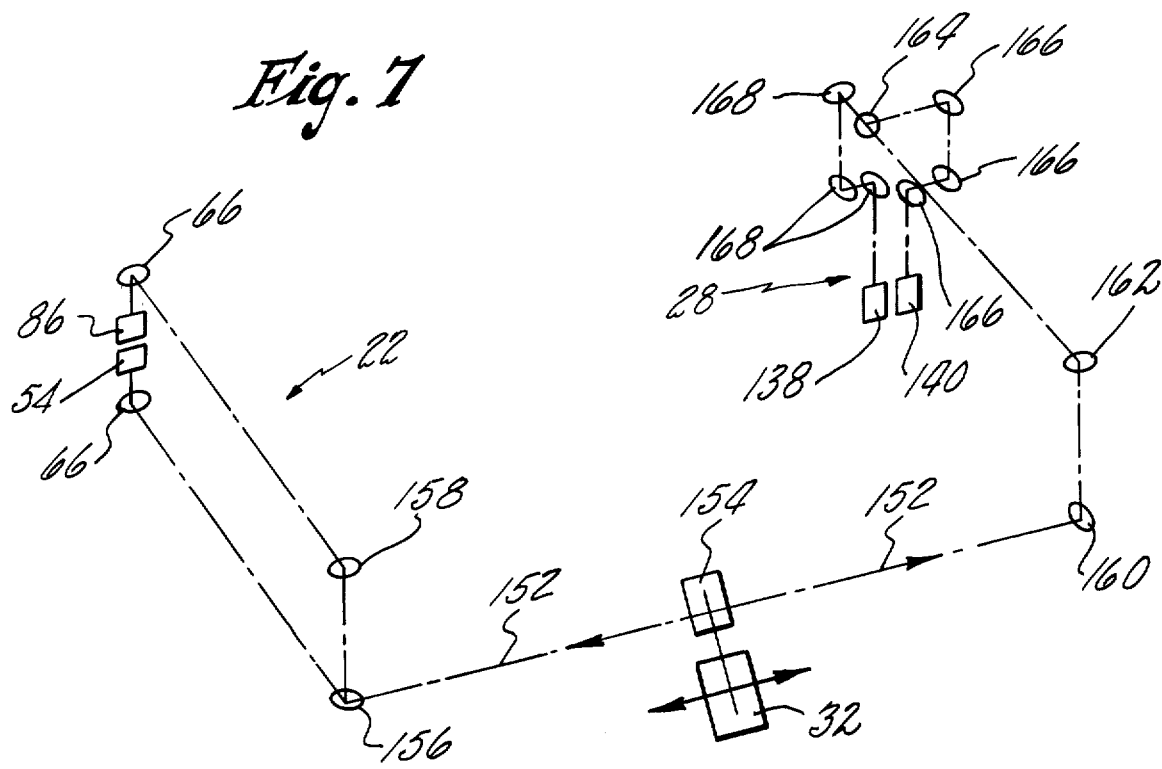

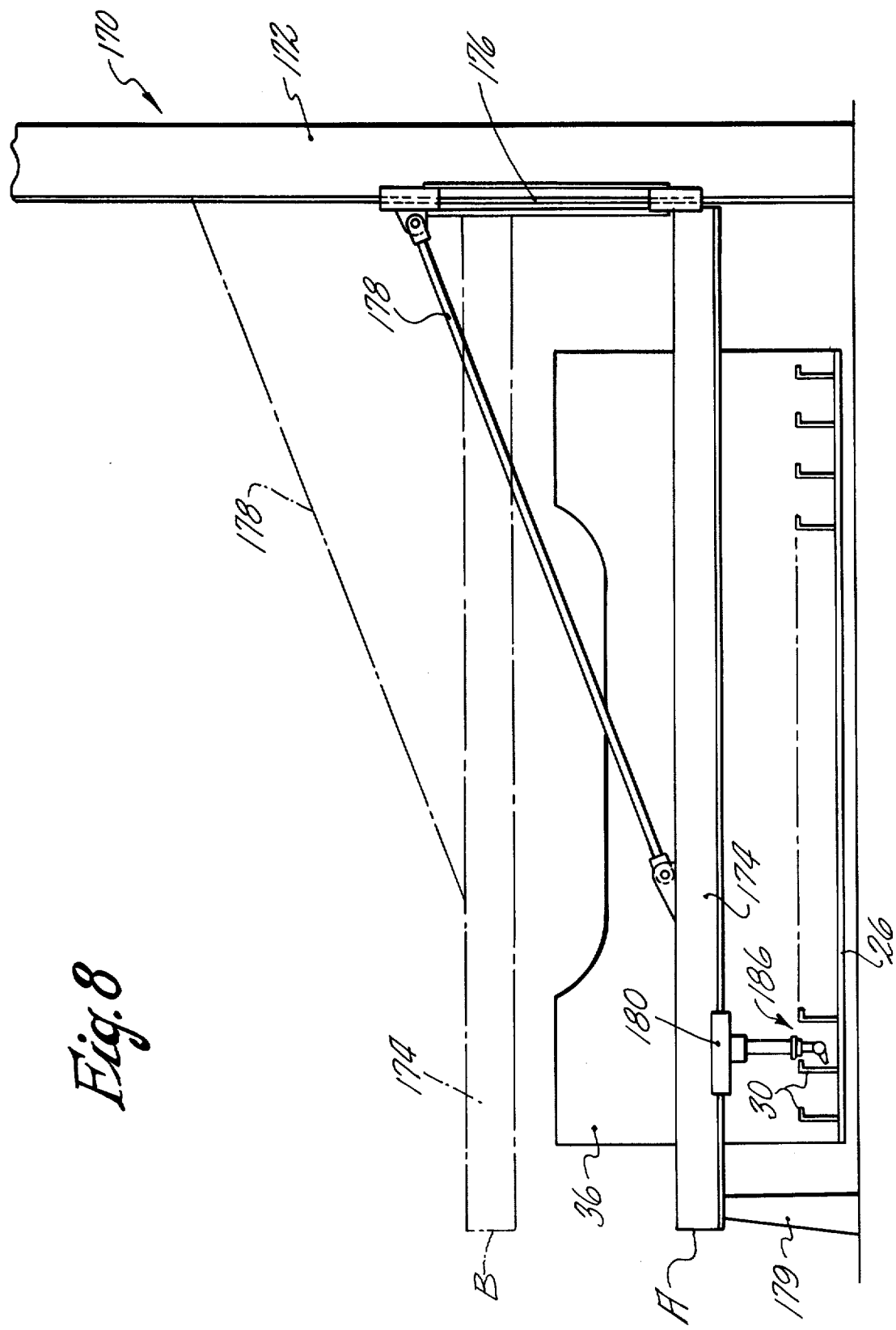

LASER WELDING APPARATUS FOR SHIPYARD PANEL SHOPS

BACKGROUND OF THE INVENTION

The present invention relates to a method and apparatus for automating the construction of ships and more particularly to an apparatus for fabricating stiffener panel sections having webs and/or bulkheads utilizing automated laser welding equipment.

Since the early 1970's, a considerable effort has been made by the shipbuilding industry to improve productivity and reduce ship construction cost. A large part of this effort has been directed to the introduction in the shipyards of automated equipment and highly mechanized assembly line production systems where emphasis has been directed to precutting components, fabricating large subassemblies with the components and constructing the ship with the subassemblies using modular techniques. As much as eighteen percent of the total welding man-hours required during ship construction occurs in panel shops within the shipyards where shell sections of the ship are fabricated.

A typical panel shop includes, as a minimum, a plate delivery station, a manually operated tack welding station, a semi-automated butt welding station, a panel turnover station for two-sided welding, a manual marking and grinding station, a numerically controlled stiffener feed station, and a semi-automatic stiffener fillet welding station. Additionally, in most shipyard panel shops, stations are also included for manually mounting and welding webs and bulkheads to the panel. Typically, the majority of shipyards employ a one-sided welding method to obtain the butt welds. In recent years a number of shipyards have employed two-sided welding methods that incorporate gantry mounted, moderately high speed arc welders. Upon the completion of a butt weld on one side of a panel, the panel is turned over and the second side is butt welded, utilizing the same arc welders. This two-sided method permits higher production rates and results in lower cost for consumable electrodes than the one-sided method. However, due to the nature of the welds formed with conventional welding techniques, simultaneous two-sided welding of panels for ships has not been feasible using prior art techniques when the panel is in a horizontal position since the weld formed on the underside of the panel does not meet specifications due in part of the effect of gravity on the molten metal within the weld. Positioning the panel in a vertical position for two-sided welding is typically unfeasible due to the large cross-sectional area of the completed panel, typically fifty feet by fifty feet.

SUMMARY OF THE INVENTION

A primary object of the present invention is to provide an automated fabrication facility for the construction of ship panels. A further object of the present invention is to provide a method and apparatus for the construction of large subassemblies suitable for the modular construction of ships which significantly reduces the number of man-hours required for the fabrication of said subassemblies.

In accordance with the present invention an automated panel welding station, adapted for two-sided butt welding of plates to form a panel subassembly suitable for ship construction comprises, a worktable, a first welding head positioned below the worktable and adapted for providing a focused beam of laser radiation to a lower side of the plates to form a lower half of a buff joint on the underside of a seam, a second welding head positioned above the worktable and adapted for providing a focused beam of laser radiation to an upper side of the plates to form an upper half of the butt joint on the upper side of the seam wherein the first and second welding heads are adapted for automatically traversing the length of the plates to provide a continuous butt joint therebetween to fabricate a panel, first optical means for directing a beam of radiation from a laser to the first welding head, second optical means for directing a beam of radiation from a laser to the second welding head, clamping means for maintaining the alignment of the seam during welding and means for tracking the seam to provide drive signals for aligning the first and second laser heads with the seam and for traversing said laser heads along the length of the seam to form a two-sided weld.

An embodiment of the present invention further includes means within the panel welding station for marking the panel for positioning and aligning stiffeners, webs and/or bulkheads thereon, a stiffener welding station located downline the panel welding station adapted for positioning stiffeners on the panel and having a pair of fillet welding heads, disposed on opposite sides of the stiffeners, adapted for focusing laser radiation onto the intersection of the stiffener and the panel to fillet weld the stiffener to the panel, and means for traversing the fillet welding heads along the length of the stiffeners. Additionally the embodiment further includes means for moving panels between stations.

Another embodiment of the present invention further includes a web/bulkhead welding station located downline the stiffener welding station adapted for welding webs and/or bulkheads to the stiffeners and panel.

A primary feature of the present invention is the first welding head rotatably attached to a first carriage located under the worktable in the panel welding station. The worktable is adapted for aligning the plates to form seams therebetween suitable for forming butt welds when exposed to a laser beam having a high intensity. The first welding head is adapted for focusing a beam of laser radiation onto the underside of the plate to form tack welds and/or finish welds along the seam on the underside of the plates. Additionally, the first carriage is adapted for automatically traversing the length of the plate to obtain a continuous weld between plates to form panels. Also, a second welding head, substantially identical to the first welding head, is rotatably attached to a second carriage. The second carriage is movably attached to a first gantry positioned above the worktable and extending over the length of the plates. The second carriage is adapted for automatically traversing the length of a plate to move the welding head along the seam to obtain a continuous butt weld thereacross. A clamp carriage, movably attached to the first gantry, has a hydraulic clamp attached thereto adapted for pressing a pair of adjacent plates to the worktable to enable the first welding head to direct a beam of radiation to the underside of the plate beneath the clamp to tack weld the plates. Additionally, an optical seam tracker having a light source attached to the clamp carriage and an optical detector attached to the first carriage is adapted for sensing the position of the seam and providing seam position coordinates to a controller adapted for automatically controlling the traversal of the first and second carriages along the length of the plates. Additionally a second seam tracker adapted for orienting the first and second welding heads to enable said welding heads to focus laser radiation to the bottom and top of the seam is attached to the first and second carriages. The means for marking the panels for alignment of stiffeners, webs and/or bulkheads includes an electromagnetic punch adapted for movement along the length and width of a panel in response to signals generated by the seam trackers.

A further feature of the present invention is the fillet welding head in the web/bulkhead welding station adapted for welding the webs and bulkheads to the stiffeners. The fillet welding head is adapted for automated movement in the horizontal and vertical direction for automated welding of the webs/bulkhead to the stiffeners. Additionally, mechanical feelers attached to each of the fillet welding heads provide position signals to a controller adapted for controlling the position and orientation of said fillet welding heads for automatic welding of the stiffeners to the panel.

A primary advantage of the present invention is the capability of performing welds on the bottom sections of the panel thereby allowing simultaneous two-sided welding of the panels. Additionally the utilization of laser beams to produce the welds and the automation of the welding process significantly reduces the time involved in the fabrication of ship shell sections. Also tack welding and finish welding of the plates to form panel sections is performed at one station by a series of orderly sequenced operations without the panel having to be turned over. The seam tracking apparatus is simple and reliable and the hydraulic clamp is a simple clamping device which thus eliminates the need for relatively high cost tacking stations with magnetic beds and/or clamping devices as utilized in prior art panel welding stations. Additionally, the optical system adapted for directing laser radiation to the first and second welding heads is capable of providing the radiation either simultaneously or sequentially to the head. Additionally providing radiation sequentially to the panel welding station and to the fillet welding station allows the laser to be utilized in a time shared mode of operation thereby requiring only one laser for the facility.

The foregoing objects, features and advantages of the present invention will become more apparent in the light of the following detailed description of the preferred embodiments thereof as illustrated in the accompanying drawing.

BRIEF DESCRIPTION OF THE DRAWING

FIG. 3 is a simplified cross-sectional view of a panel welding station in the direction 3—3 as shown in FIG. 1;

FIG. 7 is a simplified schematic of the optical path of the laser radiation provided to the panel welding station and to the stiffener welding station;

FIG. 8 is a simplified side view of the web/bulkhead welding station as shown in FIG. 1; and FIG. 9 is a simplified schematic of the major components of the web/bulkhead welding station.

DESCRIPTION OF THE PREFERRED EMBODIMENT

Figure 1:
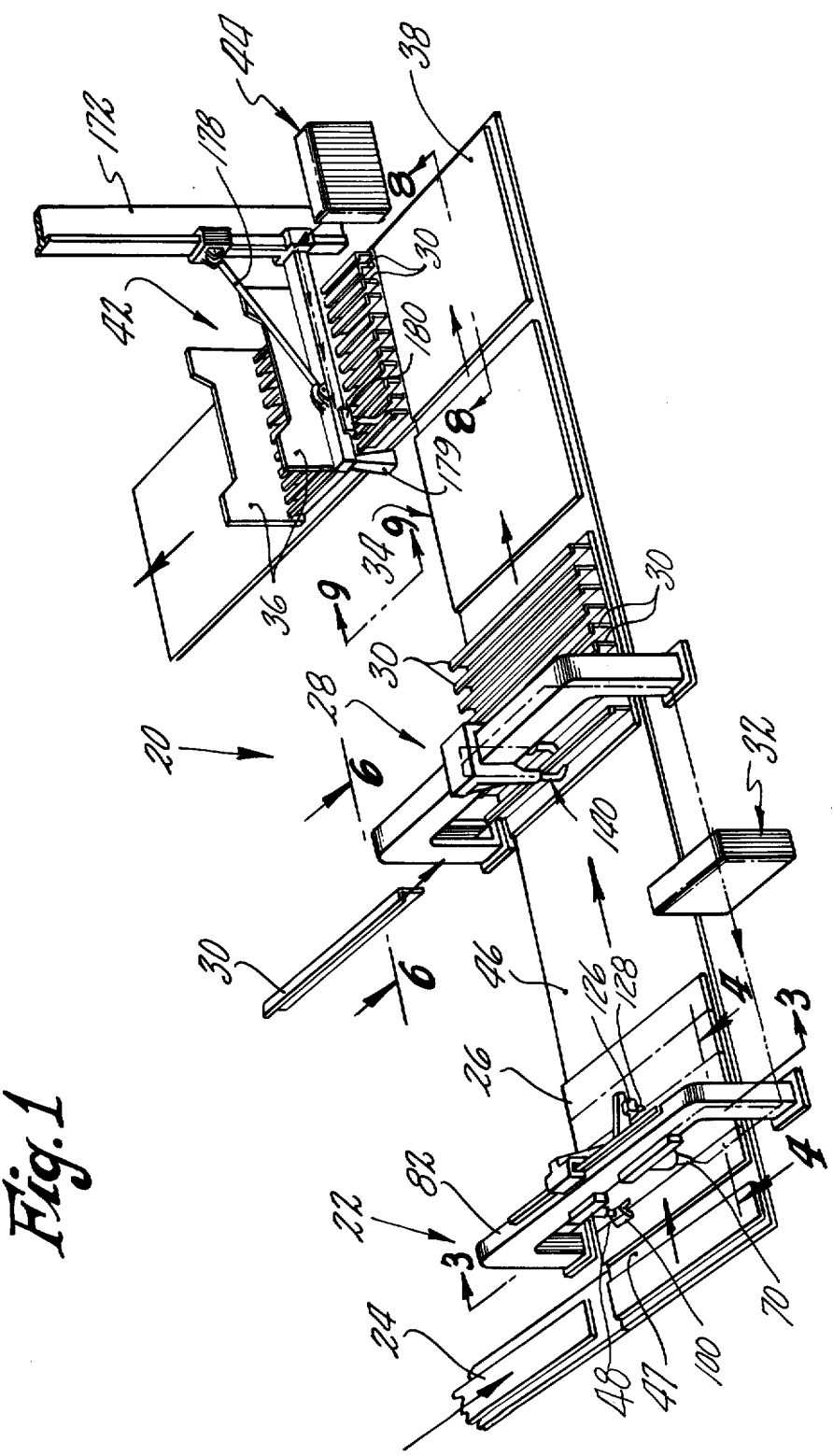
FIG. 1 is a simplified perspective view of the major components of a laser welding apparatus for forming shell sections suitable for ship construction.
Figure 2:
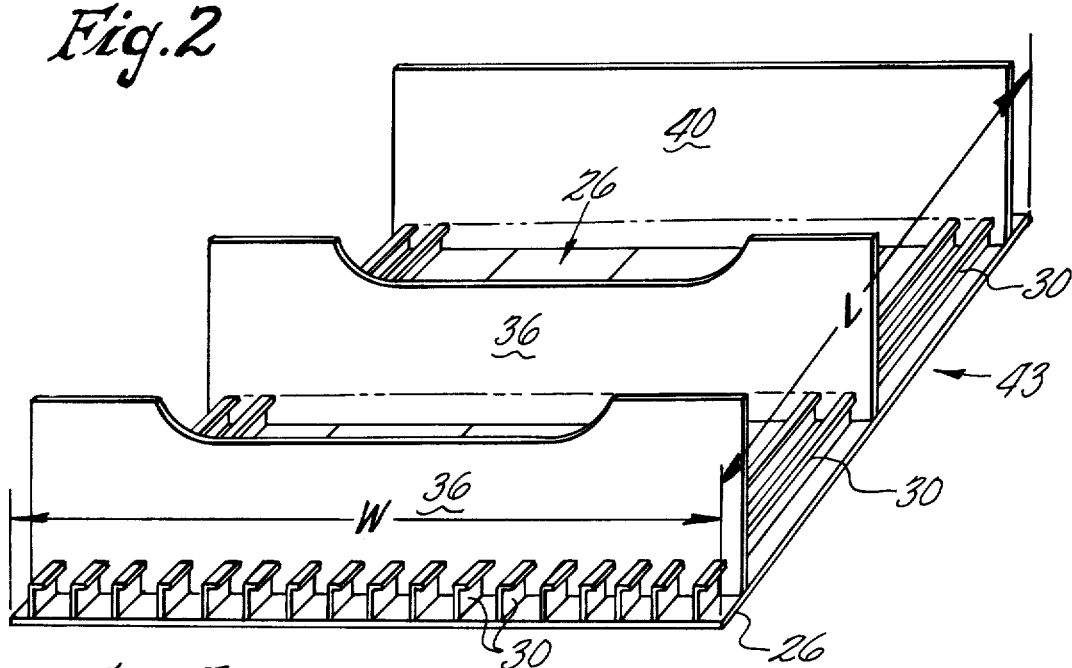
FIG. 2 is a simplified perspective view of a fabricated shell section.

Referring now to FIGS. 1 and 2 wherein a shell section fabrication facility 20 includes a panel welding station 22 adapted for tack welding and two-sided finish welding of metal plates 24 to form a panel 26 utilizing laser radiation as hereinafter described in more detail, a stiffener welding station 28 adapted for fillet welding stiffeners 30 to the panel 26 utilizing laser radiation as hereinafter described in more detail, a first laser 32 adapted for providing a beam of high power radiation to the panel welding station and to the stiffener welding station in either a time sharing mode of operation or continuously to each station; a web mounting station 34 located downline the stiffener welding station 28 adapted by means well known in the art for positioning webs 36 on the panel; a bulkhead mounting station 38 located downline the web mounting station adapted by means well known in the art for positioning bulkheads 40, on the panel; a web/bulkhead welding station 42, located downline the web and/or bulkhead mounting stations 34, 38 adapted for welding the web/bulkheads to the stiffeners and panel utilizing laser radiation as hereinafter described in more detail to complete the fabrication of a shell section 43 having a length L at width W; a second laser 44 adapted for providing a beam of high power radiation to the web/bulkhead welding station 42, and means for transporting the panels between stations such as a conveyor 46.

The metal plates 24 are continuously fed onto a worktable 47 by transfer means (not shown) well known in the art. Additionally, the stiffeners 30 are also continuously fed onto the panel 26 by transfer means (not shown) well known in the art. The worktable includes means (not shown) well known in the art for positioning the plates thereon to form a seam 48 therebetween suitable for welding purposes and for maintaining the plates in horizontal alignment during the welding process.

Figure 4:
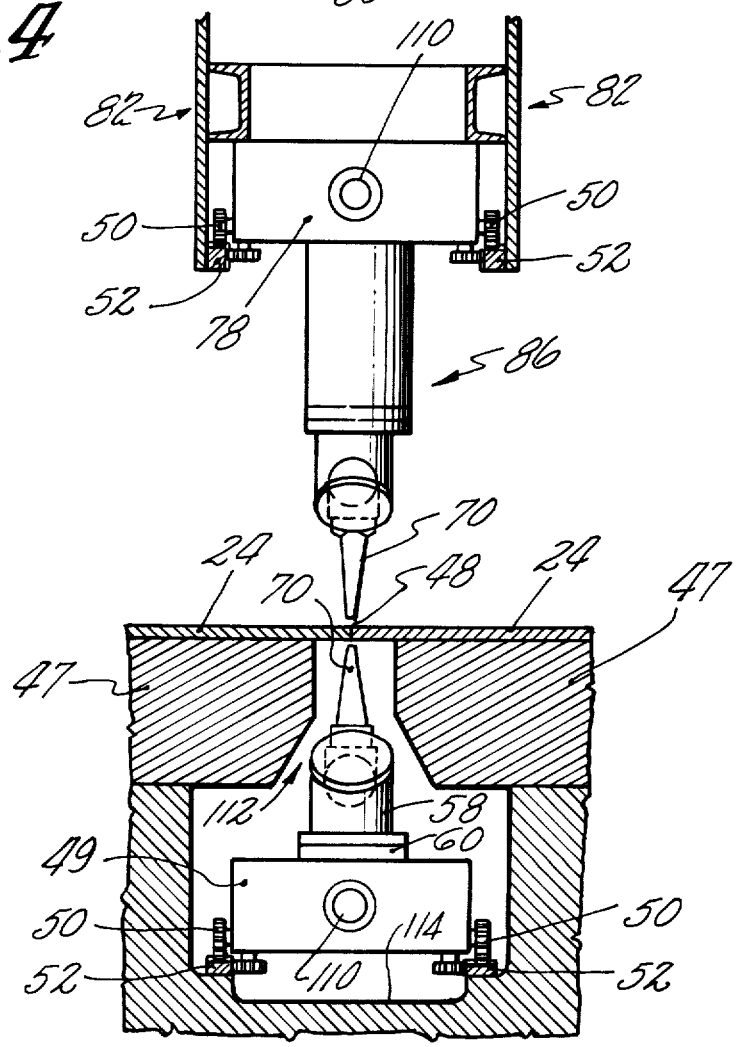
FIG. 4 is a simplified cross-sectional view of the panel welding station in the 4—4 direction as shown in FIG. 1.

Referring now to FIG. 3 which shows a simplified cross-sectional view of the major components of the panel welding station 22 in the direction 3—3 as shown in FIG. 1. A first carriage 49 located in a recess as shown in FIG. 4 is adapted for motion across the width of the worktable by pinions 50 located proximate the bottom 51 on both sides of the carriage and engagable with a pair of racks 52 extending the length of a recess under the worktable. The pinions are connected to motor means (not shown) such as a variable speed electric motor for precise rotation of the pinions to provide precise movement of the first carriage in a forward or reverse direction. A first welding head 54 attached to the top surface 56 of the first carriage includes a housing 58, a mount 60, attached at one end to the top surface of the first carriage and at the other end to the housing 58, adapted for raising and lowering said housing and for rotating said housing about a vertical portion 61 of an optical axis 62, a first deflector 64 within the housing in line-of-sight optical communication with a first turning mirror 66 positioned within the first carriage and in line-of-sight optical communication with a focusing mirror 68 adapted for focusing laser radiation through an exit 69 in the first housing onto the plate and a welding shield 70 positioned about the exit 69 adapted for preventing metal vapor and molten particles from depositing on the focusing mirror. It is to be recognized that the focusing mirror 68 may have a reflective surface 72 adapted for directing the radiation through a lens (not shown) for focusing the radiation onto the plate. The first deflector, the first turning mirror and the focusing mirror are positioned on and symmetrically about the optical axis 62, and are adapted for directing a beam of radiation from the first carriage to the underside of the plate. An optical detector 74 having a capacitance steering device 75 disposed thereon near the top of the detector is attached to a detector housing 76 which is attached to one end of the housing 58.

The panel welding station 22 further includes a second carriage 78 movably attached to rails 80 by pinions 50 engagable with racks 52 on a horizontal section 81 of a first gantry 82 suspended over the worktable by vertical support structures 84. A second welding head 86 attached to the bottom surface 88 of the second carriage includes a second mount 90 connecting the bottom surface 88 with a second housing 92 wherein the second welding head is substantially identical to the first welding head 54. The second welding head includes a detector housing 76 attached thereto having a capacitive steering device 75 attached at the end of the housing. The detector housings attached to both the first and second welding heads are substantially identical. The first welding head is adapted for first providing tack welds along the bottom of the seam between adjacent plates and then for providing butt weld along the seam in the bottom half of the plate; the second welding head is adapted for providing a butt weld along the seam in the top half of the plate to provide two-sided welding of plates to form panels. The second welding head is typically positioned above the first welding head in a vertical spaced apart relation as shown in FIG. 3 to allow gases generated during the welding process to escape to obtain a weld having a minimum porosity.

The panel welding station additionally includes a clamping carriage 94, positioned on the rails 80 of the first gantry 82 with pinions 50 and racks 52 in the same manner as the second carriage 78, having a hydraulic clamp 96 attached to one end to the bottom surface 97 of the clamping carriage with a third mount 98 adapted for rotation about a vertical axis through the hydraulic clamp and having feet 100 on the other end adapted for pressing two adjacent plates against the worktable for vertical alignment of the plates during tack welding, with the seam centrally disposed therebetween. The hydraulic clamp further includes a piston 102 attached at one end to the feet 100 and having a second end engaged in a cylinder 104 adapted for hydraulically pressing the feet onto the plates. The clamping carriage 94 contains a high intensity light source 106 adapted for transmitting a beam of radiation through a central bore 108 within the hydraulic clamp to the seam between the plates. During the tack welding process a portion of the light is transmitted through the seam onto the detector 74 which during this process is positioned in vertical alignment with the hydraulic clamp.

Referring now to FIG. 4 which shows a cross-sectional view of the panel welding station 22 in the 4—4 direction as shown in FIG. 1. Apertures 110 centrally located within the first and second carriage are adapted for passing radiation from the first laser 32 as shown in FIG. 1 to the first turning mirrors 66 within the first and second carriages. The worktable 47 has a slot 112 adapted for enabling the housing 58 of the first laser welding head 54 to be located proximate the seam during the welding operation. The first carriage 49 is located within a recess 114 extending across the width of the worktable.

Figure 5:
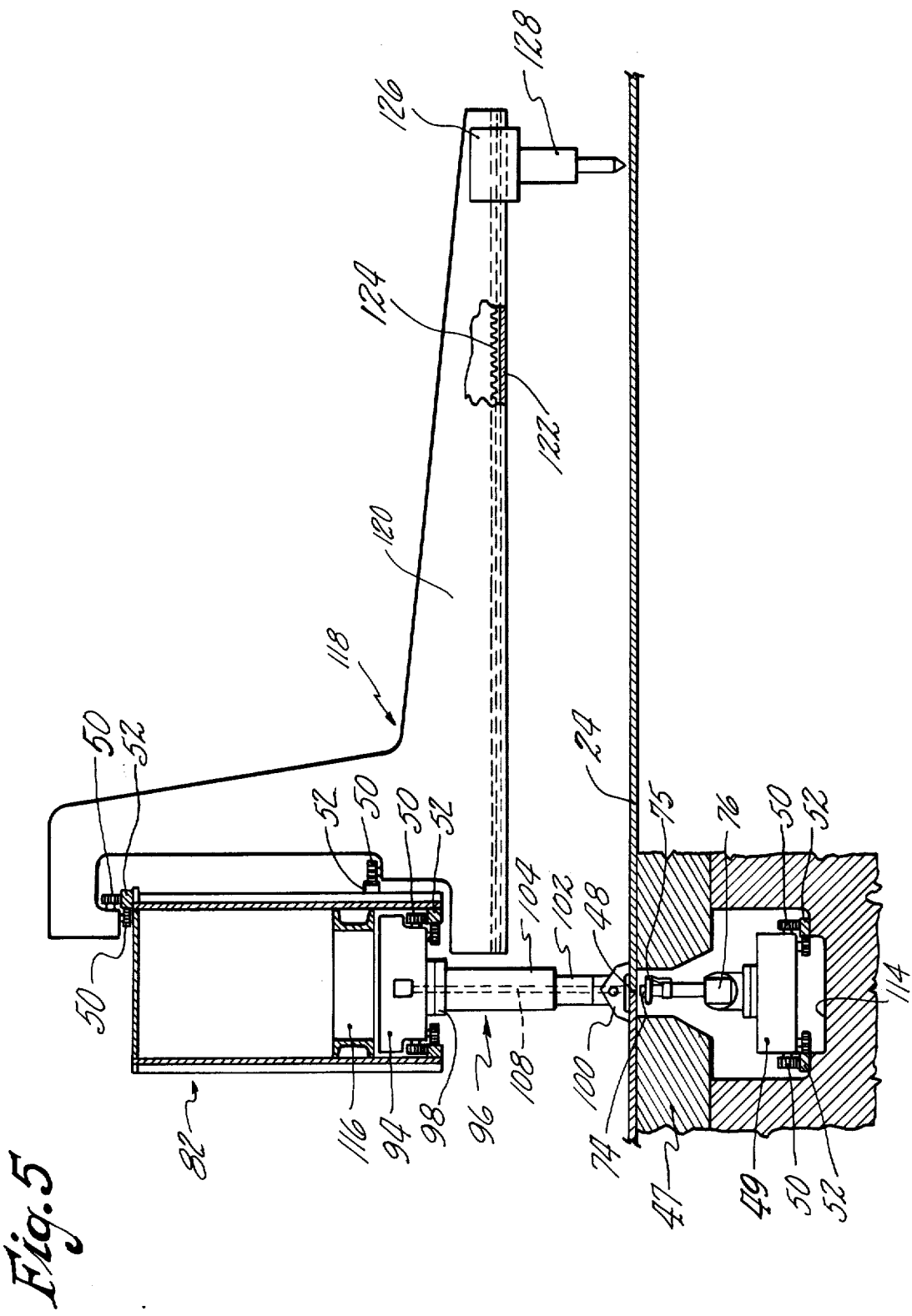
FIG. 5 is a second cross-sectional view of the panel welding station in the 4—4 direction as shown in FIG. 1.

Referring now to FIG. 5 which is a cross-sectional view of the panel welding station 22 along the same direction as FIG. 4, showing the positional relationship of the hydraulic clamp 96 and the optical detector 74 as shown in FIG. 3. The optical detector is in vertical alignment with the central bore 108 within the hydraulic clamp 96. A blocking bar 116, positioned vertically above the clamping carriage 94 within the first gantry 82, is adapted for counterbalancing the clamping carriage 94 against the pressure on the feet clamp 100 on the plates. A marking carriage 118 cantileverly mounted on one side of the first gantry has a horizontal bar 120 extending perpendicularly to the gantry along a portion of the length of the worktable and has a rail 122 with a rack 124 positioned thereon. The marking carriage includes pinions 50 engagable with racks, positioned along the top and side of the horizontal section 81 of the first gantry, adapted for moving the marking carriage along the length of the first gantry by motor means (not shown) well known in the art. A punch carriage 126 movably positioned on the rail 122 of the marking carriage has pinions (not shown) engagable with the rack 124 located on the rail, is adapted for moving an electromagnetic punch 128 across the width of a panel. The electromagnetic punch is adapted for marking the panel to provide alignment marks for the subsequent positioning of stiffeners, webs and/or bulkheads.

Figure 6:
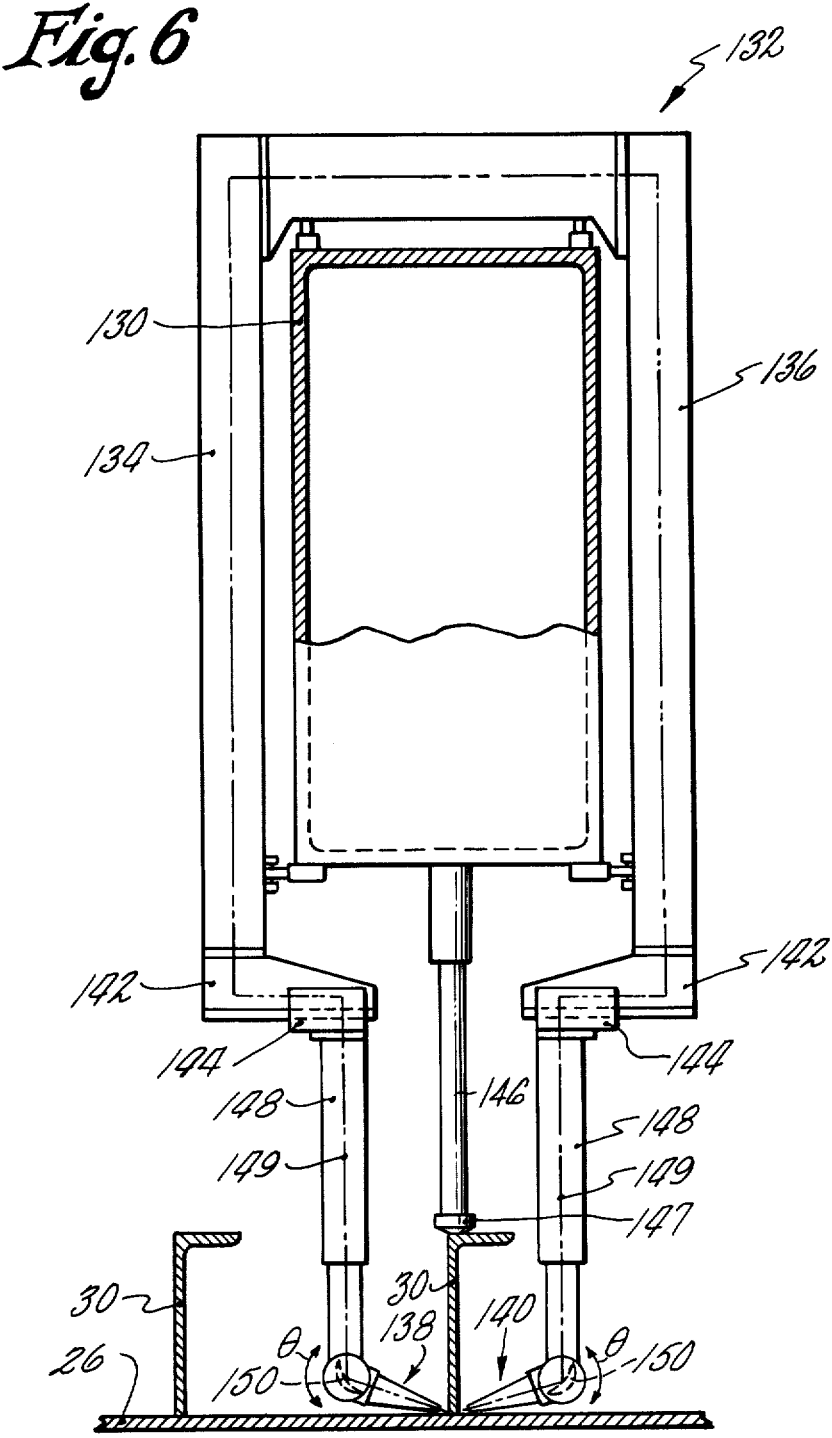
FIG. 6 is a simplified cross-sectional view of a stiffener welding station as shown in FIG. 1.

Referring now to FIG. 6 which shows a cross-sectional view of the stiffener welding station 28 as shown in FIG. 1 wherein a second gantry 130 has a fillet welding carriage 132 movably attached thereto by a rack and pinion combination (not shown) adapted for moving the fillet welding carriage across the length of the second gantry. The second gantry extends over the width of the conveyor 46 and is of a conventional design well known in the art. The fillet welding carriage has a first vertical section 134 and a second vertical section 136 extending along opposite sides of the second gantry which are adapted for accommodating a first fillet welding head 138 and a second fillet welding head 140 respectively. The vertical sections terminate at bottom ends 142 adapted for movably accommodating a first slide 144. A hydraulic press 146 fixedly attached at one end to the gantry has a pad 147 on the other end adapted for applying pressure to the stiffener 30 to maintain the alignment of the stiffener during fillet welding and to maintain the stiffener in close contact with the panel during welding. The first slides are adapted for precisely adjusting the separation between the first and/or second fillet welding heads and the stiffener. The first and second fillet welding heads are connected to the first slide by legs 148 having means well known in the art for vertically moving the first and second fillet welding heads for proper welding alignment with the stiffener/panel intersection. The first and second fillet welding heads are adapted for rotation about a vertical axis coincident with an optical axis 149 passing through the legs 148 and for rotation about a horizontal axis passing through the center of a fillet focusing mirror 150. The first and second fillet welding heads are offset from one another a distance sufficient to permit gases to escape from the molten weld zone during operation (typically offset approximately six inches) to obtain a weld zone having a minimum porosity.

Referring now to FIG. 7 wherein the optical path of the laser radiation provided to the panel welding station and to the stiffener welding station is shown. Laser radiation 152 from the source 32 is directed to a beam splitter 154 wherein a portion of the radiation is directed to the panel welding station 22 and the remaining radiation is directed to the stiffener welding station 28. A rotatable mirror 156 capable of being rotated from a first position to a second position is adapted when in the first position for directing the radiation to the first turning mirror 66 positioned within the first carriage 49 and of directing the radiation, when in the second position, to a second turning mirror 158 typically located within the first gantry 82 which directs the radiation to the turning mirror 66 located within the second carriage 78. The radiation passes from the first carriage and the second carriage to the first and second welding heads 54, 86 respectively as hereinbefore discussed to provide for sequential welding along the top and bottom of the seam. It is to be recognized that the rotatable mirror 156 may be replaced by a beam splitter reflector combination well known in the art for providing radiation simultaneously to the first and second welding heads. The remaining radiation passes from the beam splitter 154 to a third turning mirror 160 located at the base of the second gantry 130 which reflects the radiation to a fourth turning mirror 162 located near the top of the second gantry which directs the radiation along the top of the gantry to a second beam splitter 164 positioned on the fillet welding carriage. A portion of the radiation (typically fifty percent) incident onto the second beam splitter is directed to deflection mirrors 166 which direct the radiation to the second fillet welding head 140. The portion of the radiation passing through the second beam splitter 164 is deflected by deflection mirrors 168 to the first fillet welding head 138. It is to be recognized that the radiation 152 may be directed to the panel welding and stiffener welding stations 22, 28 on a time sharing basis by replaing the beam splitter 154 with a mirror adapted for being rotated to a first position for directing the radiation to the panel welding station and for being rotated to a second position for directing the radiation to the stiffener welding station. In the preferred embodiment the orientation of the mirror is regulated by a drive unit (not shown) coupled to the controller (not shown) utilized to store data and to control the welding and positioning of plates and stiffeners.

Referring now to FIG. 8 which shows a simplified side view of the web/bulkhead welding station 42 in the direction 8—8 as shown in FIG. 1, which includes a third gantry 170 having a structural column 172, a horizontal column 174 adapted for being moved from a first horizontal position A to a second horizontal position B by means well known in the art such as an electric motor driven hoist 176. The hoist also includes a guide cable 178 attached at one end to the electric motor drive hoist and at the other end to a position along the horizontal column sufficiently from an end of the column attached to the hoist to provide horizontal stability of the horizontal column. A support 179 provides end support for the horizontal column in the first position. The horizontal column is adapted for accommodating a second fillet welding carriage 180 and includes means, such as a rack cooperating with pinions attached to the second fillet welding carriage, for translating said carriage across the length of the horizontal column.

Referring now to FIG. 9, which shows in more detail the welding apparatus of the web/bulkhead welding station 42 in the direction 9—9 as shown in FIG. 1. The second fillet welding carriage is adapted for accommodating a horizontal power slide 182 having a vertical power slide 184 attached at one end. The horizontal and vertical power slides are adapted for moving a third fillet welding head 186 in the horizontal and vertical directions to enable the web 36 and the bulkhead 40 sections to be welded to the stiffeners 30 and the panel. The third fillet welding head 186 is adapted for rotation about a vertical optical axis 188 and for rotation about a horizontal axis perpendicular to the centerline axis through the welding head by means well known in the art. The third fillet welding head 186 is substantially identical to the first and second fillet welding heads 138, 140 respectively located in the stiffener welding station 28.

Laser radiation having sufficient intensity to perform the fillet welds at the web/bulkhead welding station is provided by the second laser 44. The radiation is directed, by turning mirrors located on the horizontal column 174, the horizontal power slide 182 and the vertical power slide 184, to the third fillet welding head substantially in the manner radiation is directed to the welding heads in the panel welding and stiffener welding stations. It is to be recognized that a single laser may be utilized to replace the first and second lasers 32, 44 respectively utilizing appropriate optical components well known in the art to direct radiation from the single laser to the various stations along the production line either continuously or in a time sharing mode of operation.

Referring now to FIGS. 1, 2, 3 and 4, in operation plates 24 are fed into the panel welding station 22, and are aligned and clamped together by means well known in the art to form, between adjacent plates, a seam capable of being welded. The clamping carriage 94 is moved along the first gantry 82 until the hydraulic clamp 96 is positioned over one end of the seam. The hydraulic clamp is activated with the clamp feet 100 pressing adjacent plates onto the worktable 47. The light source 106 provides an intense light beam which passes through the central bore 108 within the hydraulic clamp and is incident onto the seam between the clamp feet 100 with a portion of the beam passing through the seam to the recess 114 below the worktable. The first carriage 49 is positioned within the recess 114 such that the optical detector 74 is in alignment with the light beam passing through the seam. The position of the optical detector is adjusted to obtain a signal maximum which is directed to a controller (not shown) such as a high speed computer. The controller is adapted by means well known in the art for acquiring position coordinates from indicators (not shown) associated with the drive motors connected to the pinions on the first carriage and the clamping carriage 47, 94 respectively and with servomotors (not shown) adapted for rotating the first welding head 54, and the optical detector 74 to align the detector and the welding head with the seam. The controller includes means well known in the art for converting the position coordinate to control signals capable of automatically aligning the first carriage and the clamping carriages with the seam.

Once the position coordinates are obtained a pulse of laser radiation from the first laser is directed to the first turning mirror 66 within the first carriage and passed through the housing 58 of the first welding head 54 and focused through the welding shield 70 to the underside of the seam to produce a tack weld therein to maintain the relative position of the adjacent plates. The first welding head 54 and the optical detector 74 are in precise alignment such that as the detector tracks the seam the first welding head also tracks the seam. Once the tack weld is made the clamp is released from the surface of the plate and the clamping carriage 94 is moved along the first gantry 82 to a second position. At the second position the hydraulic clamp is again pressed against the plates with the light beam passing through the seam and the first carriage is moved within the recess to position the optical detector vertically beneath the light beam. The seam is again scanned by the optical detector 74 and the position coordinates of the second position are registered within the controller and a second tack weld is made on the underside of the seam. This procedure is continued until tack welds and position coordinates are obtained across the entire length of the seam.

Once a pair of adjacent plates have tack welds at positions along the entire length of the seam the clamping carriage is moved to the end of the first gantry into a storage position and the second carriage is moved to the first end of the first gantry with the second welding head 86 positioned above the seam at the first end of the plate. The first carriage is also returned to the first end of the seam with the first welding head positioned below the seam at the first end of the plate. Radiation from the laser source 32 is then provided to the first welding head and is focused onto the underside of the seam to form a weld. The first carriage is automatically moved across the length of the seam forming a finished joint weld along the bottom half of the plates. The position coordinates stored within the controller provide signals to the synchronous motors attached to the pinions driving the first carriage and to the servomotor which provide rotation of the first laser welding head about the vertical axis enabling the first laser welding head to automatically provide radiation to the plates along the entire length of the seam. In a similar manner radiation is provided either simultaneously or sequentially to the second welding head which automatically traverses the seam to provide a finish weld along the top half of the plate. During the welding operation the first and second welding heads are vertically separated, as shown in FIG. 3, a distance sufficient to allow gases formed during the welding operation to escape from the molten metal in the weld zone to minimize porosity of the weld. Capacitance steering devices 75 attach to the detector housings 76 on the first and second welding heads follow the vertical contours of the seams and send electrical signals to servomotors which correct the vertical position of the respective welding heads. It is to be recognized that filler material may be provided by means well known in the art, to the seam during the welding operation.

Referring now to FIG. 5, during the tack welding operation the numerically controlled electromagnetic punch 128 provides alignment marks on the panel for subsequent positioning and aligning of stiffeners and webs/bulkheads thereon. The marking carriage 118 traverses the length of the panel while the electromagnetic punch 128 marks the panel at selected positions to produce an alignment line. Accurate separation between alignment lines along the width of the panel is provided by precise movement of the punch carriage 126. Information for providing coordinate signals to the marking and punch carriages is obtained from the seam position coordinates which provide accurate reference lines from which predetermined distances for the position of adjacent alignment lines can be determined. Alignment lines for positioning the webs and bulkheads on the stiffeners are obtained in a similar manner.

Referring now to FIGS. 1 and 6, once the panel has been welded together and marked for stiffener, web and bulkhead positioning, the panel is directed to the stiffener welding station 28 by conveyer means 46. Stiffeners 30 are directed onto the panel by means well known in the art, aligned with the alignment marks and held in position with the hydraulic press 146. The hydraulic press forces the stiffener against the panel to maintain contact with the panel sufficient for welding purposes. Radiation 152 from the first laser 32 is directed to the first and second fillet welding heads 138, 140 respectively by the optical system as shown in FIG. 7. The fillet welding heads are offset approximately six inches from one another to permit gases to escape during the welding operation to minimize the porosity of the weld. As the fillet welding carriage 132 traverses the second gantry, the fillet welding heads simultaneously traverse the length of the stiffener directing radiation thereon to provide a fillet weld joint between the stiffener and the panel. Filler material may be provided to the fillet welding by means well known in the art.

Tracking the weld joint is accomplished in the conventional manner utilizing mechanical feelers attached to the fillet welding heads. The mechanical feelers provide electrical signals to appropriate servomotors which activate the fillet welding heads for rotation in the $\theta$ direction as shown in FIG. 6. Additionally the mechanical feelers provide signals to the first slide carriages 144 which adjust the distance between the weld ing heads and the stiffeners to optimize the quality of the weld. Additionally, the legs 148 are capable of motion in the vertical direction by means well known in the art for controlling the size of the weld joint. After each stiffener is welded to the plate, the hydraulic clamp 146 is removed from the stiffener, the fillet welding heads are moved to the end of the second gantry, and the panel is advanced along the conveyer until an adjacent stiffener is moved into position for welding. The hydraulic clamp is again positioned against the stiffener and the welding process is repeated.

For those operations in which webs and/or bulkheads are attached to the panels either or both a web mounting station 34 and a bulkhead mounting station 38 as shown in FIG. 1 are positioned downline the stiffener welding station and are adapted for mounting either webs or bulkheads or both onto the stiffeners by means well known in the art. After the webs and/or bulkheads are positioned on the stiffeners, the panel section is moved by the conveyer means to the web/bulkhead welding station 42 where the webs and/or bulkheads are welded to the stiffeners and to the panel.

Referring now to FIGS. 8 and 9, in operation the horizontal column 174 is raised to the second position B by the hoist 176 until a web or bulkhead passes under the horizontal column. The horizontal column is then moved to the first position A and rests on a support structure 179. The electric motor driven hoist 176 is adapted to provide a variable first position so that shell sections with web/bulkheads of various heights can be passed thereunder. Laser radiation from the second laser 44 is directed to the third fillet welding head 186 by turning mirrors similarly to the manner of direction radiation to the first and second fillet welding heads 138, 140. The third fillet welding head is aligned with the web/bulkhead-stiffener intersection by adjustments of the second fillet welding carriage 180, the first and second power slides 182, 184 and by appropriate servomotor actuation to obtain angular alignment of the welding head. During the welding operation the weld joint is tracked by means well known in the art to provide signals to the controller to automate the welding process by providing coordinate signals to drive means connected to the second fillet welding carriage 180, the first and second power slides 182, 184 and to the servomotors. The automated welding of plates to fabricate panels and the automated welding of stiffeners, webs and bulkheads to the panels to fabricate shell sections significantly reduces the number of man-hours required to fabricate shell sections. Additionally the simultaneous or sequential top and bottom welding of the plates to form panels eliminates the requirement in prior art two-sided welding of welding one side and turning the plate over to weld the second side further reducing the number of man-hours required to fabricate shell sections.

Although this invention has been shown and described with respect to a preferred embodiment thereof, it should be understood by those skilled in the art that minor changes and omissions in the form and detail thereof may be made therein without departing from the spirit and scope of the invention.

Having thus described a typical embodiment of our invention, that which we claim as new and desire to secure by Letters Patent of the United States is:

1. An automated panel welding station for the fabrication of panel subassemblies suitable for ship construction comprising:
 a worktable adapted for aligning horizontally and pressing plates together for maintaining a seam therebetween suitable for laser welding;
 a first carriage, positioned below the worktable, adapted for movement across the width of the worktable to enable a first welding head to traverse the length of the seam between a pair of adjacent plates;
 a first welding head, rotatably attached to the first carriage, adapted for directing a focused beam of laser radiation to the underside of the seam to form a weld in the bottom half of the plates defining the seam;
 means for traversing the first welding head along the length of the seam, said means adapted for being activated and controlled by a controller;
 a first gantry, positioned above the worktable, extending over the width of said worktable, adapted for supporting a second carriage;
 a second carriage, attached to the first gantry, adapted for movement along the first gantry to enable a second welding head to traverse the length of the seam between plates;
 a second laser welding head, rotatably attached to the second carriage, adapted for directing a focused beam of laser radiation to the topside of the seam to form a weld in the top half of the plates defining the seam;
 means for traversing the second welding head along the length of the seam, said means adapted for being activated and controlled by a controller;
 means for directing radiation from a first laser to the first welding head;
 means for directing radiation from a first laser to the second welding head;
 a clamping carriage, movably attached to the first gantry, adapted for movement along the first gantry to enable a first clamping means to clamp the plates onto the worktable at selected positions along the length of the seam;
 first clamping means for releasably clamping adjacent plates, proximate the seam, against the worktable to maintain the alignment of the seam during tack welding; and
 means for tracking the seam to provide position coordinates of the seam to a controller.

2. The invention in accordance with claim 1 wherein the means for tracking the seam to provide position coordinates of the seam to the controller includes:
 a light source positioned above the worktable within the clamping carriage;
 means for directing radiation from the light source to the seam; and
 an optical detector adapted for motion with the first carriage for vertical alignment with the seam for sensing a radiation maximum passing through the seam to determine the position coordinates of said stem wherein said position coordinates are utilized by the controller reactivating and controlling the means for traversing the first and second carriages.

3. The invention in accordance with claim 2 further including means for forming aligning marks along the length and width of a panel for subsequent positioning of stiffeners, webs, and/or bulkheads onto the panel for the fabrication of shell sections.

4. The invention in accordance with claim 3 wherein the means for forming alignment marks includes:
 a marking carriage movably attached to the first gantry and adapted for traversing the length of a panel;
 a punch carriage movably attached to the marking carriage and adapted for traversing the width of a panel; and
 an electromagnetic punch attached to the punch carriage and adapted for automatically marking a panel at preselected locations to form alignment lines along the length and width of the panel.

5. The invention in accordance with claim 1 further including a first laser adapted for providing radiation to the first and second welding heads.

6. The invention in accordance with claim 4 wherein the marking carriage, the punch carriage and the electromagnetic punch are adapted for being activated and position controlled by the controller utilizing position coordinates provided by position indicators on the first and second carriages.

7. The invention in accordance with claim 1 further including a first laser adapted for providing radiation to the first and second welding heads.

8. The invention in accordance with claim 4 further including a stiffener welding station located downline the automated panel welding station and adapted for two-sided fillet welding of stiffeners to a panel formed of welded plates comprising:
 means for moving the panel from the panel welding station to the stiffener welding station wherein said means for moving the panel is also adapted for moving the panel through the stiffener welding station;

a second gantry positioned above the means for moving panels and having a length sufficient to extend over the length of the panel and adapted for accommodating a stiffener welding carriage;

a stiffener welding carriage adapted for traversing the length of the second gantry;

a first fillet welding head attached to one side of the fillet welding carriage adapted for fillet welding one side of the stiffener to the panel;

a second fillet welding head attached to the second side of the fillet welding carriage and adapted for fillet welding the second side of the stiffener to the panel;

means for traversing the fillet welding carriage along the length of the second gantry;

means for positioning and aligning the first and second fillet welding heads with the stiffeners to enable welding the stiffeners to the panel; and means for directing radiation from the first laser to the first and second fillet welding heads.

9. The invention in accordance with claim 8 further including a web/bulkhead welding station located downline the stiffener welding station wherein the web/bulkhead welding station is adapted for welding webs and/or bulkheads to the stiffeners for fabricating shell sections suitable for ship construction wherein the means for moving the panel between the panel welding station and the stiffener welding station is adapted for further moving the panel to the web/bulkhead welding station.

10. The invention in accordance with claim 8 wherein the web/bulkhead welding station includes a third gantry having a horizontal column, positioned above and extending over the width of the shell section, adapted for being moved from a first horizontal position for fillet welding to a second horizontal position for passing webs and/or bulkheads thereunder;

a second fillet welding carriage movably attached to the horizontal column and adapted for traversing the width of the shell section;

a third fillet welding head adapted for welding the webs and/or bulkheads to the stiffeners to form the shell sections;

a horizontal power slide adapted for varying the horizontal separation between the third fillet welding head and the web and/or bulkheads;

a vertical power slide adapted for vertically moving the third fillet welding head wherein the horizontal power slide and the vertical power slide are adapted for moving the third fillet welding head to enable the third fillet welding head to direct radiation to the intersection of the web and/or bulkheads with the stiffeners to form a fillet weld; and means for activating and controlling the movement of the second fillet welding carriage, the horizontal power slide and the vertical power slide.

11. The invention in accordance with claim 10 further including a second laser adapted for providing laser radiation to the third fillet welding head.

* * * * *